United States Patent
Ghosh et al.

(10) Patent No.: US 8,086,543 B2
(45) Date of Patent: Dec. 27, 2011

(54) CHARITY AUCTIONS ON SOCIAL NETWORKS FOR OPTIMIZING CONTRIBUTIONS TO FUNDRAISING CAMPAIGNS

(75) Inventors: Arpita Ghosh, Santa Clara, CA (US); Mohammad Mahdian, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 758 days.

(21) Appl. No.: 11/932,282

(22) Filed: Oct. 31, 2007

(65) Prior Publication Data

US 2009/0112740 A1   Apr. 30, 2009

(51) Int. Cl.
*G06Q 99/00* (2006.01)
(52) U.S. Cl. ............ 705/319; 705/26.1; 705/39
(58) Field of Classification Search ........... 705/319, 705/26.1, 39
See application file for complete search history.

(56) References Cited

OTHER PUBLICATIONS

Conitzer, Vincent et al., "Expressive Negotiation over Donations to Charities", Proceedings of the 5th ACM conference on Electronic commerce, New York, NY, (May 17, 2004), 51-60.

*Primary Examiner* — Ramsey Refai
(74) *Attorney, Agent, or Firm* — Fiala & Weaver P.L.L.C.

(57) ABSTRACT

Methods, systems, and apparatuses for performing a fundraising campaign are provided. A charity is determined to receive contributions from a plurality of entities. With regard to the charity, contribution constraints are received from each entity of the plurality of entities. The contribution constraints for an entity may include a contribution budget and at least one conditional contribution conditioned on a contribution amount of at least one other entity contributing to the charity. Contribution amounts are calculated for the plurality of entities based on the contribution constraints. Each entity is informed of a corresponding contribution amount of the calculated contribution amounts, so that the entities can provide their respective contribution amounts to the charity.

17 Claims, 6 Drawing Sheets

500

502 — set initial contribution amounts for the entities to a maximum contribution amount 504 — iteratively decrease contribution amounts for the entities from the initial contribution amount to converge to a vector of contribution amounts feasible for the plurality of entities based on the contribution constraints received from each entity

802 solve the set of equations to calculate contribution amounts for the second portion of the plurality of entities

# CHARITY AUCTIONS ON SOCIAL NETWORKS FOR OPTIMIZING CONTRIBUTIONS TO FUNDRAISING CAMPAIGNS

BACKGROUND OF THE INVENTION

1. Field of the Invention

The present invention relates to fundraising, and in particular, to optimization of contributions to fundraising campaigns.

2. Background Art

Charitable giving constitutes an essential and growing part of the world economy, providing benefits to persons around the world. For example, charities provide funding for public projects, provide aid to reduce income inequality, and provide significant aid to persons suffering from natural disasters. According to a recent survey, charitable giving in the United States totaled over $295 billions in year 2006, which amounts to over 2.7% of total personal income. The vast majority of this sum is donated by individuals. Only a small portion (approximately 1.3%) is from "mega-gifts" that receive media attention.

The reasons why individuals donate to charities, and ways to encourage such donations, have been the subjects of extensive research. These reasons include social, psychological, and economic factors. A common technique that governments and employers use to encourage donations from individuals is by increasing the benefit of a donation through a gift-matching program. Experimental and field studies have shown that offering to match the contribution of a donor has a significant effect on the likelihood and the amount of a donation. However, such current gift-matching programs do not typically enable further customization of donations, which may better incentivize charitable gift giving.

What is needed are further ways for encouraging persons to donate to charities, to increase the amounts of such donations, and to enable donations to be made based on more complex sets of constraints relative to current techniques.

BRIEF SUMMARY OF THE INVENTION

Methods, systems, and apparatuses for performing a fundraising campaign are provided. The fundraising campaign may be for a charity, for example. An entity contributing to the campaign can provide contribution constraints that cause contribution amounts of the entity to depend on the contribution amounts of other entities contributing to the campaign. For example, the contributions of the entity may depend on contribution amounts of any number of other entities according to any relationship, including linear and/or non-linear functions.

In an example aspect, a charity is determined to receive contributions from a plurality of entities. Contribution constraints are received from one or more entities of the plurality of entities. The contribution constraints for an entity may include a contribution budget and at least one conditional contribution conditioned on a contribution amount of at least one other entity of the plurality of entities. Contribution amounts are calculated for the plurality of entities based at least in part on the received contribution constraints. Each entity is informed of a corresponding contribution amount of the calculated contribution amounts.

In a further aspect, a total contribution amount that is a sum of the calculated contribution amounts is maximized, to maximize an amount of contributions to the charity.

Contribution constraints may include the contribution budget and the one or more conditional contributions mentioned above, and may also include a non-conditional contribution amount, and/or any other contribution constraint.

The contribution amounts of the plurality of entities may be calculated in any manner. For example, initial contribution amounts for the entities may be set to a maximum contribution amount. The initial contribution amounts may be iteratively decreased to converge to a vector of contribution amounts feasible for the plurality of entities based on the contribution constraints received from each entity.

The iterative determination of the contribution amounts may be performed in any manner. For example, for each entity, if a contribution amount of the entity can be the contribution budget of the entity without violating a contribution constraint of the entity, the contribution amount of the entity is set to the contribution budget of the entity. If the contribution amount of the entity cannot be the contribution budget of the entity without violating a contribution constraint of the entity, an equation is determined for the entity that is based on the conditional contribution received for the entity, and that sets the contribution amount of the entity to the contribution budget for the entity. In this manner, contribution amounts are determined for a first portion of the plurality of entities, and a set of equations is determined for a second portion of the plurality of entities. The set of equations can be solved to calculate contribution amounts for the second portion of the plurality of entities.

In another aspect, a system for performing a charity campaign includes a charity campaign engine. The charity campaign engine is configured to receive contribution constraints from each entity of a plurality of entities contributing to a determined charity. For example, the contribution constraints may be received through a user interface. The contribution constraints include a contribution budget and at least one conditional contribution conditioned on a contribution amount of at least one other entity of the plurality of entities. The charity campaign engine is configured to calculate contribution amounts for the plurality of entities based on the contribution constraints received from each entity.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example Embodiments

The example embodiments described herein are provided for illustrative purposes, and are not limiting. Further structural and operational embodiments, including modifications/alterations, will become apparent to persons skilled in the relevant art(s) from the teachings herein.

Embodiments of the present invention relate to donations made to charities and similar organizations. Embodiments increase incentives to contribute to charities by enabling contributions to be proposed by entities (e.g., persons, corporate entities, etc.) that are conditioned on donations of other entities. Entities are enabled to express conditional bids to charities, and a contribution amount outcome is calculated based on the conditional bids. For example, the conditional bid of each entity can be conditioned on the contribution from a set of "friends", acquaintances, and/or other known entities specified by the entity, and therefore an underlying social network may be involved. Embodiments are applicable to collecting contributions for a charitable cause, and/or more generally to any type of fundraising, including organizational fundraising, and fundraising for the public good.

Embodiments of the present invention combine social networking with the concept of allowing users to match the contribution of others, in order to increase the incentive of potential donors to contribute to a fundraising campaign. In addition to the added economic incentive resulting from matching contributions (e.g., a user whose contribution is fully matched by another will know that every dollar he/she contributes adds "X" dollars to the total raised in the campaign), the social networking component encourages potential donors to contribute to the campaign.

Figure 1:
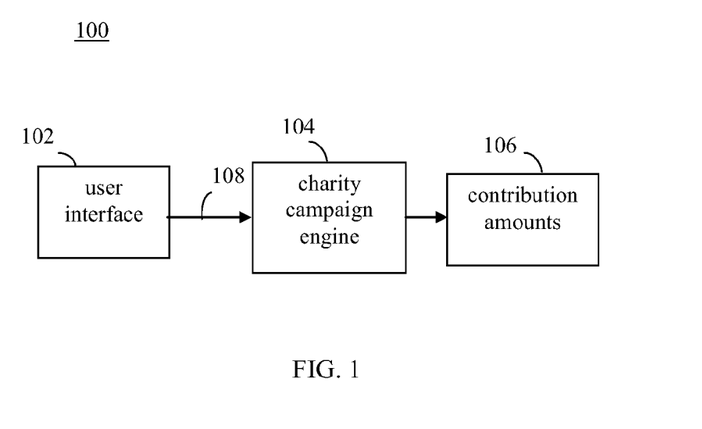
FIG. 1 shows a block diagram of a fundraising campaign system, according to an example embodiment of the present invention.

FIG. 1 shows a block diagram of a fundraising campaign system 100, according to an example embodiment of the present invention. As shown in FIG. 1, system 100 includes a user interface 102 and a charity campaign engine 104. System 100 may be used to conduct a fundraising campaign for one or more designated charities, to determine contribution amounts 106 for entities contributing to the campaign.

Entities interact with user interface 102 to join the fundraising campaign, and/or to input contribution bids, that include contribution constraints 108, to the one or more charities. Contribution constraints 108 are received by charity campaign engine 104. Charity campaign engine 104 calculates contribution amounts 106 for the entities, based on contribution constraints 108. The calculated contribution amounts 106 are provided to the entities (e.g., through user interface 102) to inform them of their respective contribution amounts that are to be donated to the one or more charities.

User interface 102 may include any user interface interaction mechanism. For example, in embodiments, user interface 102 and charity campaign engine 104 may be located in a common computer system, or may be located in separate computer systems. User interface 102 may include a display, keyboard, mouse, and/or other user interface mechanism, to enable entities to join the fundraising campaign, to input contribution constraints 108, and/or to be informed of contribution amounts 106.

Charity campaign engine 104 may be implemented in hardware (e.g., a computer system, electrical circuits/logic, etc.), software, firmware, or any combination thereof, to receive contribution constraints 108 and to calculate contribution amounts 106. For example, charity campaign engine 104 may be implemented in a computer system, such as a server, a desktop computer, a mobile computer (e.g., a handheld computer such as a personal digital assistant (PDA) or Palm Pilot™, a laptop computer, etc.). In an example embodiment, charity campaign engine 104 is embodied in code that executes in one or more processors of the computer system.

Figure 2:
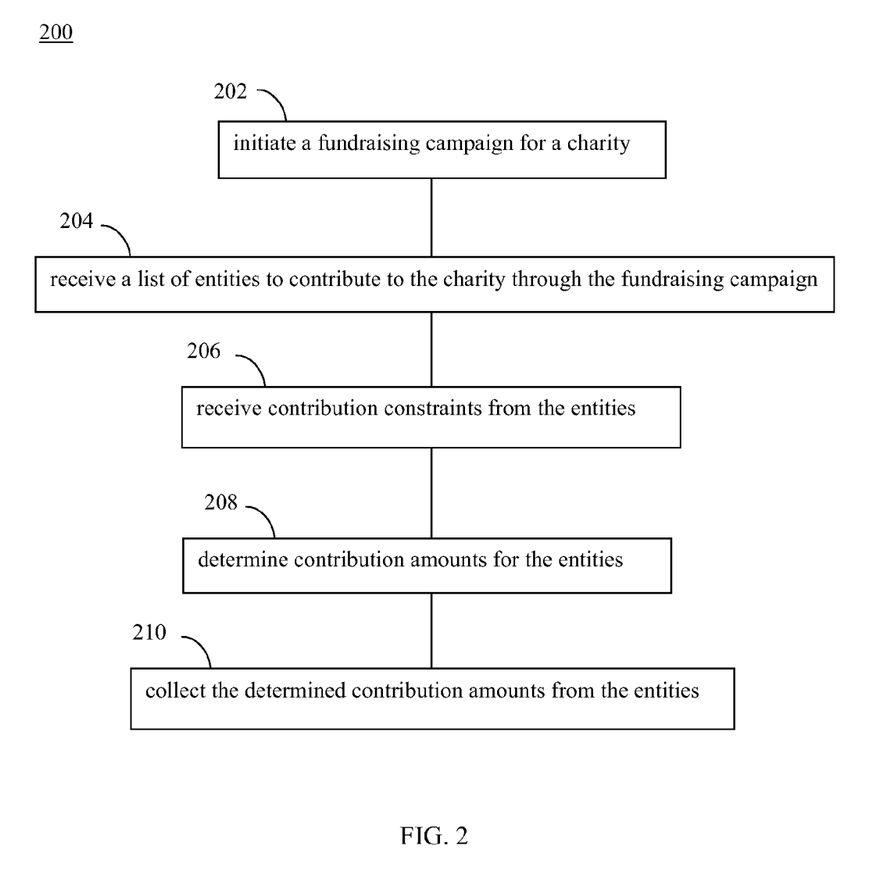
FIG. 2 shows a flowchart for performing a fundraising campaign for a charity or similar organization, according to an example embodiment of the present invention.

FIG. 2 shows a flowchart 200 for performing a fundraising campaign for a charity or similar organization, according to an example embodiment of the present invention. For example, system 100 shown in FIG. 1 may be used to implement flowchart 200, in an embodiment. Further structural and operational embodiments will be apparent to persons skilled in the relevant art(s) based on the discussion regarding flowchart 200. In some embodiments, not necessarily all steps of flowchart 200 must be performed. Flowchart 200 is described as follows.

Flowchart 200 begins with step 202. In step 202, a fundraising campaign is initiated for a charity. An entity (e.g., a campaign organizer) starts a fundraising campaign for a charity or similar organization formed to provide help to persons/entities in need. Any charity may be selected, including an individual, a charitable organization, etc. Charities may be formed to help disadvantaged persons, including children, elderly, poor persons, persons suffering from diseases or injuries, and survivors or natural or man-made catastrophes, to help animals, to aid research in curing/treating diseases and/or other maladies, and for further reasons. A fundraising campaign may be initiated by specifying the objective of the campaign (e.g., a monetary and/or other goal, etc.), and by listing one or more charities to be recipients of the resulting contributions. One or more dates or deadlines for the campaign may be determined, such a date/time when the campaign ends and contributions are collected. Alternatively, a campaign can be configured to terminate at any date/time after a specified period of inactivity.

In step 204, a list is received of entities to contribute to the charity through the fundraising campaign. In embodiments, the campaign organizer can invite one or more individuals and/or organization to join the charity fundraising campaign. For example, to provide an invitation, an email, text message, or letter can be sent to the invitee. For instance, the invitation can be sent automatically and/or by human interaction. Further individuals and/or organizations may be enabled to join the campaign without invitation. For example, advertisements, word of mouth, and/or other techniques may be used to attract further participants in the charity. A list, such as a table or other list format type, may be compiled to list the entities making contributions.

Figure 3:
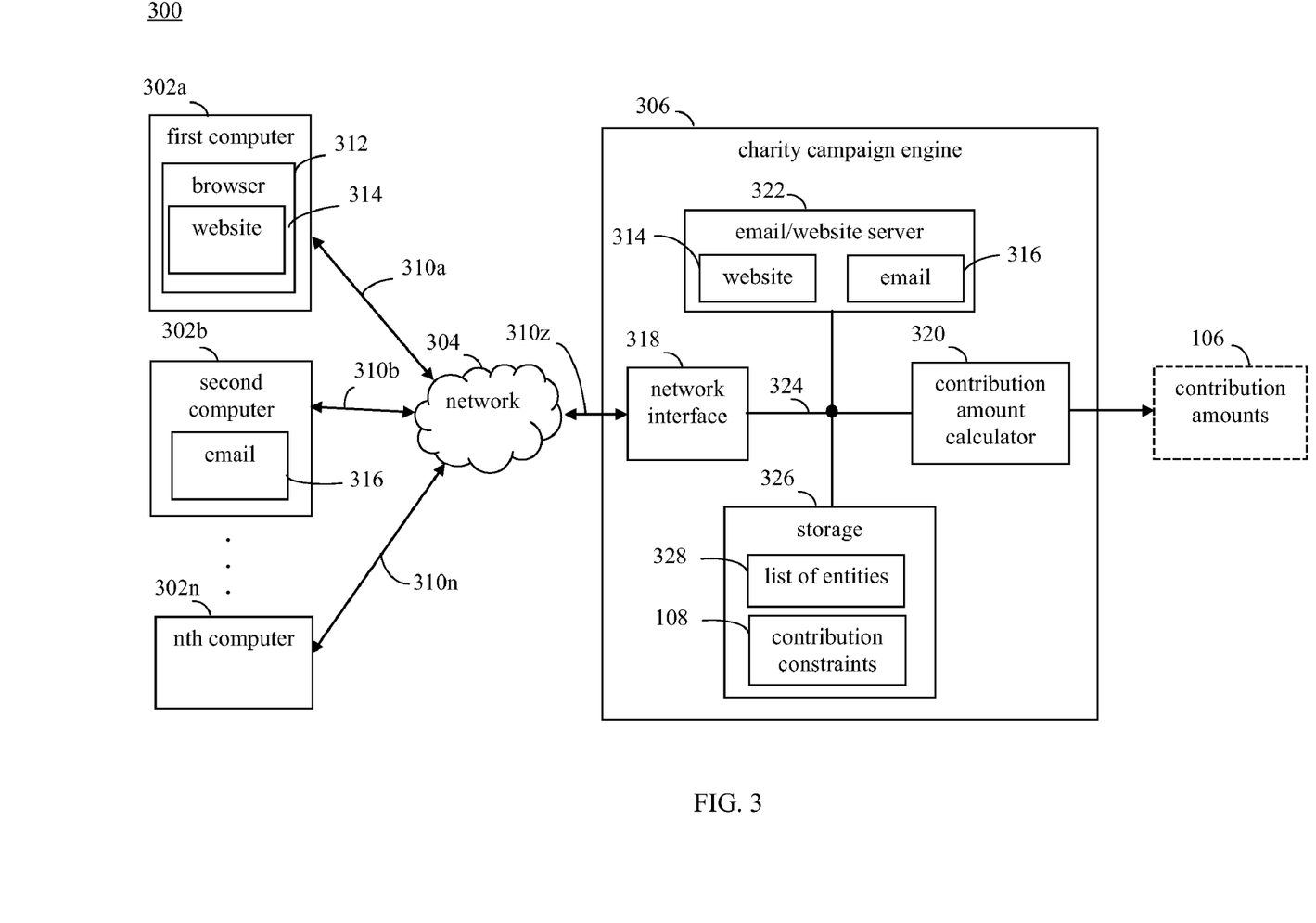
FIG. 3 shows a block diagram of a fundraising campaign system, which is an example of the system shown in FIG. 1, according to an embodiment of the present invention.

Step 204 of flowchart is described as follows with respect to FIG. 3, for illustrative purpose. FIG. 3 shows a block diagram of a fundraising campaign system 300, which is an example of system 100 shown in FIG. 1, according to an embodiment of the present invention. As shown in FIG. 3, system 300 includes first-nth computers 302a-302n, a network 304, and a charity campaign engine 306. Any number of computers 302 may be present in system 300. Computers 302 can be any type of computer, including server, desktop, or mobile. Charity campaign engine 306 is an example embodiment for charity campaign engine 104 shown in FIG. 1. In the embodiment of FIG. 3, entities use computers 302a-302n to join the campaign and/or to provide contribution constraints 108. Computers 302a-302n are communicatively coupled to charity campaign engine 306 through communication links 310a-310n, network 304, and communication link 310z. Communication links 310a-310n couple corresponding ones of computers 302a-302n to network 304, and charity campaign engine 306 is coupled to network 304 through communication link 310z. Network 304 may be any type of communication network, such as a local area network (LAN) or wide area network (WAN), or a combination of networks, such as the Internet. Communication links 310 may be any type or combination of communication links suitable for coupling devices to a network, including wired and/or wireless links, such as IEEE 802.11 wireless LAN (WLAN) wireless links, Ethernet links, USB links, etc.

Charity campaign engine 306 may be embodied in one or more computer systems, including one or more servers, desktop computers, mobile computers, etc. Engine 306 may be configured in any manner to perform its functions. For instance, as shown in the example embodiment of FIG. 3, engine 306 may include a network interface 318, a contribution amount calculator 320, an email/website server 322, and storage 326.

Network interface 318 is a communication interface for charity campaign engine 306 with network 304 through communication link 310z. Network interface 318 may be any type of communication interface, including an IEEE 802.11 WLAN interface, an Ethernet interface, a USB interface, and/or any other interface type mentioned elsewhere herein or otherwise known. In the example of FIG. 3, network interface 318 is coupled to email/website server 322 and contribution amount calculator 320 through communication link 324, which may be any type of communication link, wired and/or wireless, such as a computer bus, a plurality of electrical signals, an Ethernet link, a USB link, etc.

Entities may join the campaign and/or provide contribution constraints 108 in any manner, including through a website, email, text messaging, telephone, etc. In embodiments, email/website server 322 may be a server for emails and/or a website related to the campaign. For example, as shown in FIG. 3, a user of first computer 302a may use a browser 312 to access a website 314 hosted by email/website server 322. Website 314 may provide information about the campaign, may have a form that can be filled out by the user of first computer 302a to join the campaign, and may have a form that enables the user of first computer 302a to input contribution constraints. In an embodiment, website 314 is a web service that provides an interface for accessing charity campaign engine 306.

In another example, email/website server 322 may generate an email 316, and may transmit email 316 through network 304 to users, such as a user of second computer 302b, to invite the user of second computer 302b to join the campaign. The user of second computer 302b may accept the invite to the campaign and/or may provide contribution constraints to the campaign by transmitting a response email to email 316 to charity campaign engine 306. Alternatively, the user of second computer 302b may accept the email invite to the campaign and/or may provide contribution constraints by accessing website 314.

Existing participants of the campaign may be enabled to invite further participants to join the campaign, such as through the use of email, telephone, etc. For example, an email can be sent to a potential new participant from charity campaign engine 306 and/or another campaign participant with information such as a description of the campaign, an amount of money the inviting entity has offered to match the contribution of the potential new participant, and/or a total amount of money raised by the campaign so far.

In step 206, contribution constraints are received from the entities. As described above, contribution constraints 108 can be provided by entities to charity campaign engine 306 in any manner, including through a website (e.g., website 314), email (e.g., by receiving and responding to email 316), text messaging, telephone, etc. An entity can provide any type of contribution constraint to dictate how the entity provides a contribution to the charitable campaign. For example, the entity may provide one or more conditional contribution amounts, a non-conditional contribution amount, and/or a maximum contribution amount. As shown in FIG. 3, storage 326 stores a list 328 of entities participating in the fundraising campaign (as received/compiled in step 204). Contribution constraints 108 received for entities of list 328 may be stored in storage 326 of charity campaign engine 306. Note that storage 326 shown in FIG. 3 may be any type of storage, including one or more storage devices/elements, such as a hard disc drive, an optical disc drive, a memory device (e.g., a static random access memory (SRAM), a dynamic random access memory (DRAM), etc.), and/or other storage medium.

A conditional contribution amount is a contribution amount of a first entity that is conditioned on a contribution amount provided by another entity (a "conditional entity") contributing to the campaign. For example, a donating entity may specify a conditional contribution amount as a function that maps a vector of contributions of other donating entities to a real number. A function "f" may be specified as a conditional contribution for a first entity such that if a second entity "i" contributes an amount $x_i$ to the campaign, the first entity is willing to contribute up to an amount that is a function of $x_i$. The first entity may express conditional contributions based on any number of entities. For example, in a linear relationship embodiment, a conditional portion of a charitable contribution bid, f(x), of a first donating entity may be expressed as a linear equation as follows:

$$f(x) = \sum_{i=1}^{n} a_i x_i \qquad \text{Equation 1}$$

where i=an index for conditional entities for the first entity, n=a number of the entities upon which the first entity's contribution may be conditioned, $x_i$=the contribution amount of an entity i of the n entities upon which the first entity's contribution is conditioned, and $a_i$=a coefficient denoting a proportion by which the first entity will match of the contribution amount of the entity i.

A vector A may be formed of the matching coefficients $a_i$ for the first entity.

In an embodiment, charity campaign engine 306 may restrict conditional contributions of entities to a relatively simple form so that users may better understand the bidding process, and will thus be more likely to enter contributions. For example, as in Equation 1, charity campaign engine 306 may restrict conditional contributions of entities to linear matching amounts (e.g., if a second entity contributes X amount, the first entity will contribute 2X). However, in other embodiments, charity campaign engine 306 may enable conditional contributions of entities of any complexity, including conditional contributions having non-linear relationships with contributions of entities.

The entities that a first entity's contributions are conditioned upon may be any persons, organizations, and/or other entities known to the first entity. For example, the entities may be a set of friends of the first entity on a social network, a set of friends-of-friends on a social network, or any other person or organization that joins the campaign. The first entity can also specify whether he/she is willing to trust the entities whose contribution he/she is matching to make the contribution directly to the one or more charities, or whether he/she wants verification from charity campaign engine 306 that such contributions are made. Verification can be provided in the form of an email (e.g., from email/website server 322), a text message, or other type of verification. Such verification can be provided if entities make credit card payments to the charity through charity campaign engine 306, for example.

As stated above, an entity can specify an unconditional contribution to the campaign. An unconditional contribution is a contribution made by the entity to the fundraising campaign regardless of the contributions of others. Equation 2 shown below may represent a charitable contribution bid of a first entity, including an unconditional portion and a conditional portion:

$$\text{bid} = UC + f(x) \qquad \text{Equation 2}$$

where

UC=the unconditional contribution of the first entity, and f(x)=the conditional contribution portion of a first entity's bid.

In the event f(x) is represented as Equation 1, Equation 2 can be rewritten as follows:

$$\text{bid} = UC + \sum_{i=1}^{n} a_i x_i \qquad \text{Equation 3}$$

As indicated above, an entity can specify a maximum contribution amount, such as a maximum amount of matching contribution he/she is willing to provide in contribution constraints 108 and/or a maximum total contribution amount. Equations 4 and 5 shown below may represent a charitable contribution bid of a first entity, including a conditional contribution portion and a maximum matching contribution amount portion:

$$\text{bid} = \sum_{i=1}^{n} a_i x_i, \text{ where bid} \leq MMC \qquad \text{Equation 4}$$

$$MMC \geq \sum_{i=1}^{n} a_i x_i \qquad \text{Equation 5}$$

where

MMC=the maximum matching contribution amount for the first entity. Equation 6 shown below may represent a charitable contribution bid of a first entity, including a conditional contribution portion, an unconditional contribution portion, and a maximum matching contribution portion:

$$\text{bid} = UC + \sum_{i=1}^{n} a_i x_i, \text{ where bid} - UC \leq MMC \qquad \text{Equation 6}$$

Equation 6 can be rewritten as Equation 7 below, to include a term indicating a maximum total contribution amount (MTC):

$$MTC \geq UC + \sum_{i=1}^{n} a_i x_i, \qquad \text{Equation 7}$$

where

MTC=a maximum total contribution amount for the first entity (MMC+UC).

Referring back to flowchart 200 in FIG. 2, in step 208, contribution amounts are determined for the entities. In an embodiment, contribution amount calculator 320 receives contribution constraints 108 from storage 326, and determines contribution amounts 106 for the entities in list 328. Contribution amount calculator 320 may be configured in hardware, software, firmware, or any combination thereof, to perform step 208. Contribution amount calculator 320 may store calculated contribution amounts 106 in storage 326.

In step 210, the determined contribution amounts are collected from the entities. In an embodiment, each determined contribution amount is provided to a respective entity of list 328, to inform the respective entity of the contribution amount owed to the one or more charities. The determined contribution amounts may be transmitted to the entities through email, text messaging, telephone, a postal service, and/or any in other manner. For instance, in the example of FIG. 3, an email may be transmitted to users of one or more of computers 302a-302n to inform the respective entity of the contribution amount due. An entity may provide their respective contribution amount to charity campaign engine 306 directly, such as by submitting a credit card payment to website 314, through email, or may provide their payment in any other manner.

Figure 4:
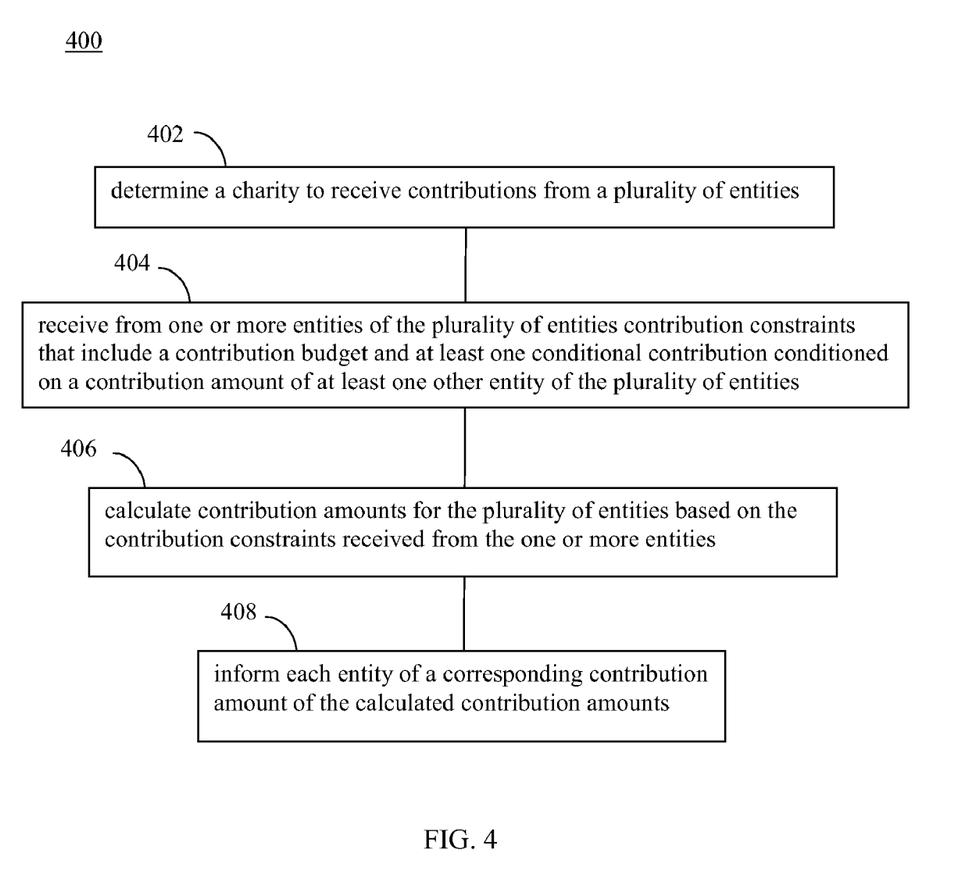
FIG. 4 shows a flowchart for performing a fundraising campaign for a charity or similar organization, according to an example embodiment of the present invention.

FIG. 4 shows a flowchart 400 for performing a fundraising campaign for a charity or similar organization, as an example of flowchart 100 in FIG. 1, according to an example embodiment of the present invention. Flowchart 400 is described below with reference to fundraising campaign system 300 of FIG. 3, for illustrative purposes. Further structural and operational embodiments will be apparent to persons skilled in the relevant art(s) based on the discussion regarding flowchart 400. Flowchart 400 is described as follows.

Flowchart 400 begins with step 402. In step 402, a charity is determined to receive contributions from a plurality of entities. Any charity may be selected to receive contribution from a plurality of entities, including charities of the types described elsewhere herein, such as with respect to step 102 of flowchart 100 of FIG. 1. Step 402 may be performed by one or more persons and/or in an automated fashion.

In step 404, contribution constraints that include a contribution budget and at least one conditional contribution conditioned on a contribution amount of at least one other entity of the plurality of entities is received from one or more entities of the plurality of entities. As described above with respect to step 206 of flowchart 200 in FIG. 2, contribution constraints 108 may be received from entities including a contribution budget (e.g., a maximum matching contribution amount, a maximum total contribution amount, etc.), and one or more conditional contributions. Furthermore, a non-conditional contribution amount may be received from one or more entities.

An example fundraising campaign is described as follows, for illustrative purposes. In this example, four entities (Entities 1-4) are contributing to the charity determined in step 402. Contribution constraints may be provided by the four entities, as shown in Table 1 below:

|  | contribution budget | unconditional contribution amount | condition on Entity 1 | condition on Entity 2 | condition on Entity 3 | condition on Entity 4 |
|---|---|---|---|---|---|---|
| Entity 1 | $100 MTC | $100 | 0 | 0 | 0 | 0 |
| Entity 2 | $200 MMC | $200 | 2 | 0 | 0 | 0 |
| Entity 3 | $400 MMC |  | 0.5 | 2.0 | 0 | 1.2 |
| Entity 4 | $600 MTC | $ 50 | 3.0 | 1.0 | 0.25 | 0 |

Entries shown in the fourth-seventh columns are the matching coefficients $a_{ij}$. In an embodiment, list 328 and contribution constraints 108 can have the form of Table 1, or may be stored in any other form.

Equation 6 can be expressed for Entities 1-4, as follows:

bid=$100                                                                                                Entity 1:

bid=$200+2×$x_1$, where bid≤$400                                          Entity 2:

bid=0+0.5×$x_1$+2.0×$x_2$+1.2×$x_4$, where bid≤$400             Entity 3:

bid=$50+3.0×$x_1$+1.0×$x_2$+0.25×$x_3$, where bid≤$600         Entity 4:

In the current example, Entities 2-4 are providing conditional contributions, while Entity 1 is only providing an unconditional contribution amount. Note that any number of entities may participate in the fundraising campaign, and any number of the participating entities may provide conditional contributions.

In step 406, contribution amounts are calculated for the plurality of entities based on the contribution constraints received from each entity. In an embodiment, contribution amount calculator 320 of FIG. 3 calculates contribution amounts 106. In an embodiment, contribution amount calculator 320 is configured to maximize a total contribution amount, which is a sum of the contribution amounts calculated for the participating entities. In a linear contribution constraint embodiment, such as sum, which may be maximized, may be expressed as follows:

$$\text{maximize} \sum_{j=1}^{n} \left( UC_j + \sum_{i=1}^{n} a_{ij} x_{ij} \right),$$

such that each entity j's maximum contribution budget is not exceeded, and
where:
$UC_j$=the unconditional contribution amount of entity i,
$a_{ij}$=a coefficient denoting a proportion by which entity j will match of the contribution amount of entity i, and
$x_{ij}$=the contribution amount of an entity i upon which the contribution of entity j is conditioned according to $a_{ij}$.

Contribution amount calculator 320 may be configured in any way to perform step 406. For example, linear programming solvers may be used to solve a set of linear equations formed by the bids of the participating entities, as would be known to persons skilled in the relevant art(s). Further techniques may be used to determine contribution amounts, as would become apparent to persons skilled in the relevant art(s) from the teachings herein.

Figure 5:
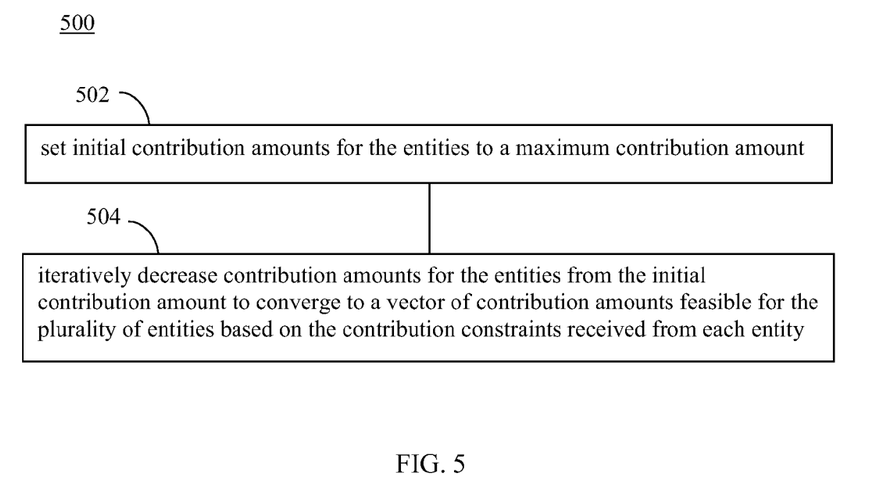
FIG. 5 shows a flowchart for determining contribution amounts for entities contributing to a fundraising campaign, according to an example embodiment of the present invention.

In an example embodiment, step 406 may be performed according to flowchart 500 shown in FIG. 5, and which is described as follows. In step 502 of flowchart 500, initial contribution amounts for the entities are set to a maximum contribution amount. According to step 502, contribution amounts for each entity may be set to a contribution budget amount, such as a maximum total contribution amount, or a maximum matching contribution amount, provided by the entities in step 404.

For instance, continuing the current example, contribution amounts for Entities 1-4 may be set as follows:

bid=$100                                                                                                Entity 1:

bid=$400                                                                                                Entity 2:

bid=$400                                                                                                Entity 3:

bid=$600                                                                                                Entity 4:

In step 504, contribution amounts for the entities are iteratively decreased from the initial contribution amount to converge to a vector of contribution amounts feasible for the plurality of entities based on the contribution constraints received from each entity. According to step 504, a set of contribution amounts are determined that satisfy the conditions (contribution constraints 108) imposed by the bids of the participating entities. The contribution amounts are determined by iteratively decreasing the contribution amounts initially set in step 502. The iterations continue until a vector of contribution amounts is converged upon that is feasible, such that the contribution amount of each entity is at most the amount specified by his/her bid. Any type of iterative technique may be used to converge on a vector of feasible contribution amounts from the initial contribution amounts, as would be known to persons skilled in the relevant art(s).

Figure 6:
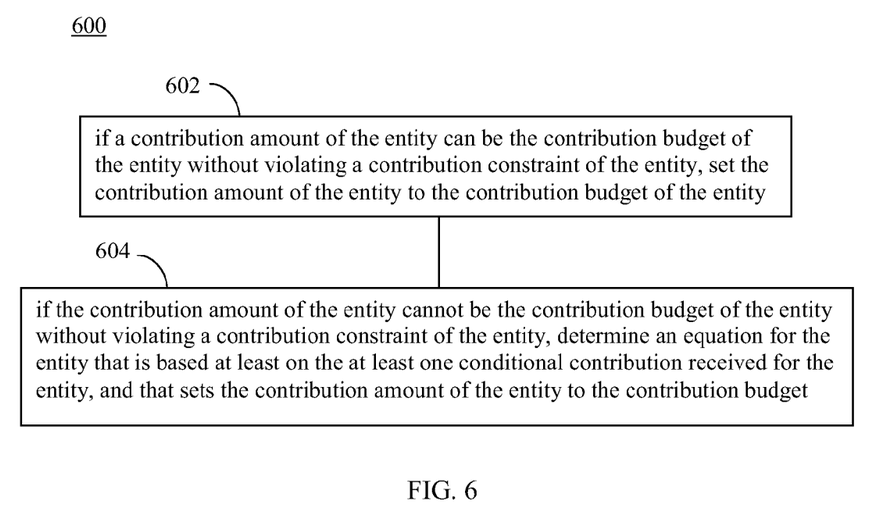
FIG. 6 shows a flowchart providing an iterative technique for determining contribution amounts for entities contributing to a fundraising campaign, according to an example embodiment of the present invention.
Figure 7:
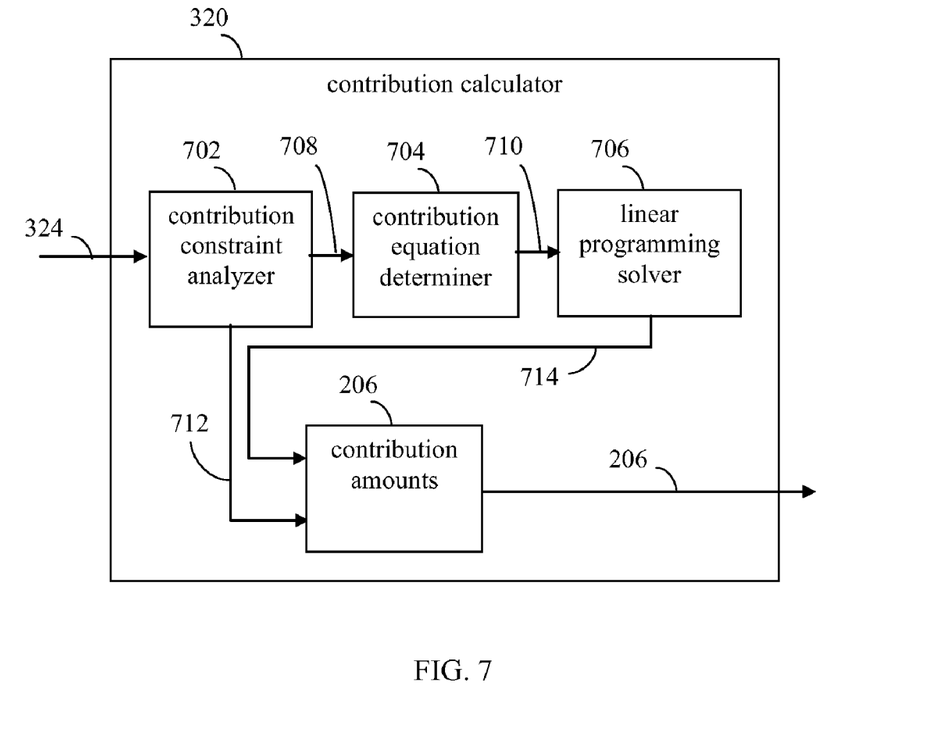
FIG. 7 shows a contribution calculator, according to an example embodiment of the present invention.

For example, in an embodiment, step 504 of flowchart 500 may be performed according to a flowchart 600 shown in FIG. 6, which is described as follows. Flowchart 600 is described with respect to contribution calculator 320 shown in FIG. 7, according to an example embodiment of the present invention. As shown in FIG. 7, contribution calculator 320 includes a contribution constraint analyzer 702, a contribution equation determiner 704, and a linear programming solver 706.

Flowchart 600 may be performed for each entity participating in the fundraising campaign. In step 602 of flowchart 600, if a contribution amount of the entity can be the contribution budget of the entity without violating a contribution constraint of the entity, set the contribution amount of the entity to the contribution budget of the entity. For example, referring to FIG. 7, contribution constraint analyzer 702 may perform step 602. Contribution constraint analyzer 702 receives contribution constraints 108 for an entity of list 328 from storage 326 (shown in FIG. 3). Analyzer 702 analyzes contribution constraints 108 of an entity to determine whether the entity is can contribute its contribution budget to the campaign without violating a contribution constraint. If the entity is contributing its contribution budget to the campaign without violating a constraint, analyzer 702 outputs contribution amount 712 as the contribution amount for the entity. If the entity cannot contributing its contribution budget to the campaign without violating a contribution constraint, analyzer 702 outputs equation determiner enable signal 708 to enable contribution equation determiner 704 to perform step 604 for the entity.

For instance, the bids of Entities 1-4 shown above for the current example are repeated below in equation form:

bid=$100                                                                Entity 1:

bid=$200+2×$x_1$, where bid≦$400                                        Entity 2:

bid=0+0.5×$x_1$+2.0×$x_2$+1.2×$x_4$, where bid≦$400                     Entity 3:

bid=$50+3.0×$x_1$+1.0×$x_2$+0.25×$x_3$, where bid≦$600                  Entity 4:

As shown above, the bid of Entity 1 is the maximum total contribution amount for Entity 1, as shown in Table 1 above, without any conditional contributions. Thus, analyzer 702 may set the contribution amount for Entity 1 to the contribution budget ($100) for Entity 1 (according to step 602), and output this set amount as contribution amount 712 for Entity 1. The bid of Entity 2 includes a non-conditional portion ($200) and a conditional portion that depends only on the contribution of Entity 1, which is known. Analyzer 702 may set the contribution amount for Entity 2 to the contribution budget ($400) for Entity 2 (according to step 602), and the contribution constraint for Entity 2, based on the contribution amount of Entity 1, is not violated. In other words, analyzer 702 may determine the contribution amount of Entity 2, as $200+2($100)=$400, which equals the maximum total contribution amount of Entity 2, as shown in Table 1 above. Thus, analyzer 702 may set the contribution amount for Entity 2 to the contribution budget ($400) for Entity 2 (according to step 602), and output this set amount as contribution amount 712 for Entity 2.

In contrast, the bids of Entities 3 and 4 have constraints that would be violated if set to their respective maximum contribution budgets. For example, with respect to Entity 3, the maximum contribution amount shown in Table 3 is $400. The contribution amount of Entity 3 is 0+0.5($100)+2.0($200)+1.2×$x_4$=$450+1.2×$x_4$, which violates the maximum total budget constraint of Entity 3 (i.e., $450>$400 maximum contribution budget constraint for Entity 3). With respect to Entity 4, the maximum contribution amount shown in Table 3 is $600. The contribution amount of Entity 4 is $50+3.0($100)+1.0($400)+0.25×$x_3$=$750+1.0×$x_3$, which violates the maximum total budget constraint of Entity 4 (i.e., $750>$600 maximum contribution budget constraint for Entity 4). Thus, the contribution amounts of Entities 3 and 4 cannot be solved by analyzer 702 according to step 602.

In step 604, if the contribution amount of the entity cannot be the contribution budget of the entity without violating a contribution constraint of the entity, an equation is determined for the entity that is based on the contribution constraints received for the entity, and that sets the contribution amount of the entity to the contribution budget. For example, referring to FIG. 7, contribution equation determiner 704 may perform step 604. Contribution equation determiner 704 receives equation determiner enable signal 708 to enable contribution equation determiner 704 to determine an equation for the entity based on the contribution constraints. For instance, continuing the current example, determiner 704 may determine equations for Entities 3 and 4 that express their respective contribution constraints, and that set the contribution amounts of Entities 3 and 4 to their respective budgets, as shown below:

$400=0+0.5×$x_1$+2.0×$x_2$+1.2×$x_4$                                    Entity 3 Equation:

$600=$50+3.0×$x_1$+1.0×$x_2$+0.25×$x_3$                                 Entity 4 Equation:

In this example, the equations are linear equations, and are similar to the form of Equation 6 shown above, set to their respective maximum total contribution budgets. In other embodiments, other types of equations may be used, including non-linear equations, depending on the particular contribution constraints that are present.

As mentioned above, flowchart 600 may be performed for each entity participating in the fundraising campaign. According to step 602, contribution amounts are determined for a first portion of the plurality of entities participating in the fundraising campaign. According to step 604, a set of equations is determined corresponding to a second portion of the plurality of entities performing in the fundraising campaign, who did not have contribution amounts determined in step 602.

Figure 8:
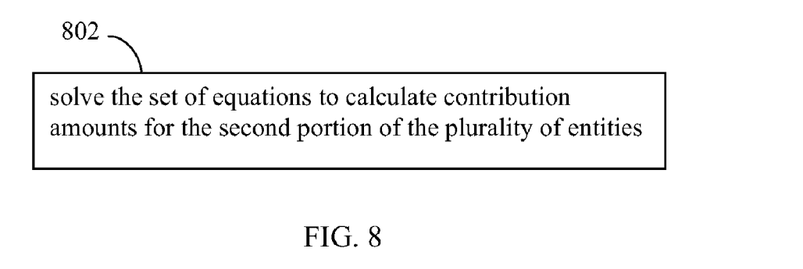
FIG. 8 shows a step for solving a set of equations determined according to the flowchart of FIG. 6, according to an example embodiment of the present invention.

After performance of flowchart 600 for each entity, step 802 shown in FIG. 8 may be performed, according to an example embodiment of the present invention. In step 802, the set of equations may be solved to calculate contribution amounts for the second portion of the plurality of entities. The set of equations (determined in step 604) may be solved in any manner, as would be known to persons skilled in the relevant art(s). For example, as shown in FIG. 7, linear programming solver 706 may be used to solve the set of equations when such equations are linear. Any number of such equations may be present, depending on the number of entities for which equations are generated in step 604. Following the current example, linear programming solver 706 may be used to solve the equations shown above for Entities 3 and 4. Linear programming solver 706 may use any type of linear programming solver application and/or technique to solve the equations, as would be known to persons skilled in the relevant art(s).

Note that contribution constraint analyzer 702, contribution equation determiner 704, and linear programming solver 706 may be implemented in hardware, software, firmware, or any combination thereof. For example, contribution constraint analyzer 702, contribution equation determiner 704, and linear programming solver 706 may be implemented using electrical circuits, logic (hardware or software), code that executes in a processor, or any combination of the same.

Referring back to flowchart 400 shown in FIG. 4, in step 408, each entity is informed of a corresponding contribution amount of the calculated contribution amounts. In embodiments, entities may be informed of their corresponding contribution amounts in a similar manner as described above with respect to step 210 of FIG. 2, or in any other manner, as would be known to persons skilled in the relevant art(s).

Example Computer Implementation

Figure 9:
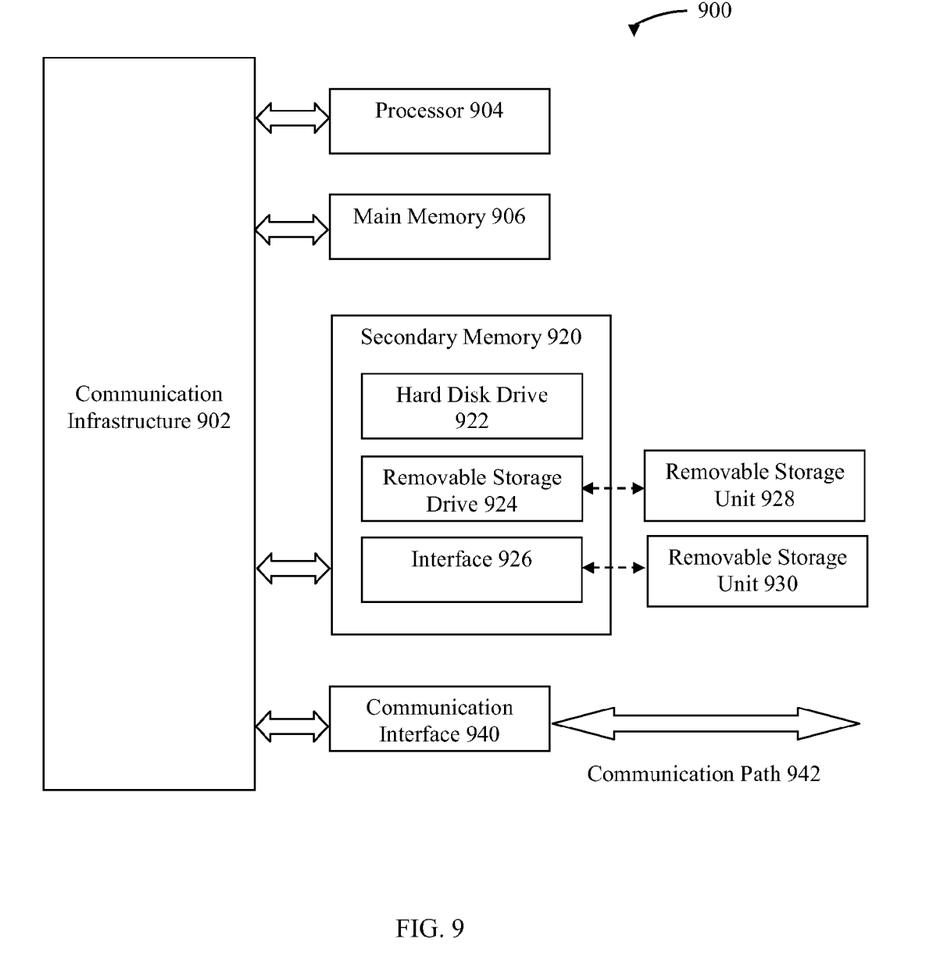
FIG. 9 shows a block diagram of an example computer system in which embodiments of the present invention may be implemented.

The embodiments described herein, including systems, methods/processes, and/or apparatuses, may be implemented using well known servers/computers, such as computer 902 shown in FIG. 9. For example, fundraising campaign systems 100 and 300 shown in FIGS. 1 and 3, contribution calculator 320 shown in FIG. 7, flowchart 200 shown in FIG. 2, flowchart 400 shown in FIG. 4, flowchart 500 shown in FIG. 5, flowchart 600 shown in FIG. 6, and step 802 shown in FIG. 8 can be implemented using one or more computers 902.

Computer 902 can be any commercially available and well known computer capable of performing the functions described herein, such as computers available from International Business Machines, Apple, Sun, HP, Dell, Cray, etc.

Computer 902 includes one or more processors (also called central processing units, or CPUs), such as a processor 906. Processor 906 is connected to a communication bus 904. In some embodiments, processor 906 can simultaneously operate multiple computing threads.

Computer 902 also includes a main or primary memory 908, such as random access memory (RAM). Primary memory 908 has stored therein control logic 928A (computer software), and data.

Computer 902 also includes one or more secondary storage devices 910. Secondary storage devices 910 include, for example, a hard disk drive 912 and/or a removable storage device or drive 914, as well as other types of storage devices, such as memory cards and memory sticks. Removable storage drive 914 represents a floppy disk drive, a magnetic tape drive, a compact disk drive, an optical storage device, tape backup, etc.

Removable storage drive 914 interacts with a removable storage unit 916. Removable storage unit 916 includes a computer useable or readable storage medium 924 having stored therein computer software 928B (control logic) and/or data. Removable storage unit 916 represents a floppy disk, magnetic tape, compact disk, DVD, optical storage disk, or any other computer data storage device. Removable storage drive 914 reads from and/or writes to removable storage unit 916 in a well known manner.

Computer 902 also includes input/output/display devices 922, such as monitors, keyboards, pointing devices, etc.

Computer 902 further includes a communication or network interface 918. The network interface 918 enables the computer 902 to communicate with remote devices. For example, network interface 918 allows computer 902 to communicate over communication networks or mediums 924B (representing a form of a computer useable or readable medium), such as LANs, WANs, the Internet, etc. Network interface 918 may interface with remote sites or networks via wired or wireless connections.

Control logic 928C may be transmitted to and from computer 902 via the communication medium 824B. More particularly, computer 902 may receive and transmit carrier waves (electromagnetic signals) modulated with control logic 830 via communication medium 924B.

Any apparatus or manufacture comprising a computer useable or readable medium having control logic (software) stored therein is referred to herein as a computer program product or program storage device. This includes, but is not limited to, computer 902, main memory 908, secondary storage devices 910, removable storage unit 916 and carrier waves modulated with control logic 930. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of performing a charity campaign, comprising:
    determining a charity to receive contributions from a plurality of entities;
    receiving contribution constraints from each entity of the plurality of entities that include a contribution budget and at least one conditional contribution conditioned on a contribution amount of at least one other entity of the plurality of entities;
    calculating, using at least one processor, contribution amounts for the plurality of entities based on the contribution constraints received from each entity, wherein said calculating contribution amounts for the plurality of entities comprises:
        setting initial contribution amounts for the entities to a maximum contribution amount, and
        iteratively decreasing contribution amounts for the entities from the initial contribution amount to converge to a vector of contribution amounts feasible for the plurality of entities based on the contribution constraints received from each entity; and
    informing each entity of a corresponding contribution amount of the calculated contribution amounts.

2. The method of claim 1, wherein said calculating comprises:
    maximizing a total contribution amount that is a sum of the calculated contribution amounts.

3. The method of claim 1, wherein said receiving comprises:
receiving from at least one entity a non-conditional contribution as a contribution constraint; and
wherein said calculating comprises:
calculating contribution amounts for the plurality of entities based on the contribution constraints, including the non-conditional contribution received from the at least one entity.

4. The method of claim 1, wherein said iteratively decreasing contribution amounts for the entities comprises performing for each entity:
if a contribution amount of the entity can be the contribution budget of the entity without violating a contribution constraint of the entity, setting the contribution amount of the entity to the contribution budget of the entity; and
if the contribution amount of the entity cannot be the contribution budget of the entity without violating a contribution constraint of the entity, determining an equation for the entity that is based at least on the at least one conditional contribution received for the entity, and that sets the contribution amount of the entity to the contribution budget;
whereby contribution amounts are determined for a first portion of the plurality of entities, and a set of equations is determined corresponding to a second portion of the plurality of entities.

5. The method of claim 4, wherein said iteratively decreasing contribution amounts for the entities further comprises:
solving the set of equations to calculate contribution amounts for the second portion of the plurality of entities.

6. A system for performing a charity campaign, comprising:
a computer;
a charity campaign engine implemented in the computer configured to receive contribution constraints from each entity of a plurality of entities contributing to a determined charity that include a contribution budget and at least one conditional contribution conditioned on a contribution amount of at least one other entity of the plurality of entities;
wherein the charity campaign engine is configured, at least partially in hardware, to calculate contribution amounts for the plurality of entities based on the contribution constraints received from each entity;
wherein the charity campaign engine is configured to set initial contribution amounts for the entities to a maximum contribution amount; and
wherein the charity campaign engine is configured to iteratively decrease contribution amounts for the entities from the initial contribution amount to converge to a vector of contribution amounts feasible for the plurality of entities based at least on the contribution constraints received from each entity.

7. The system of claim 6, further comprising:
a user interface configured to inform an entity of a corresponding contribution amount of the calculated contribution amounts.

8. The system of claim 7, wherein the user interface enables the entity to provide the contribution constraints for the entity.

9. The system of claim 6, wherein the charity campaign engine is configured to maximize a total contribution amount that is a sum of the calculated contribution amounts.

10. The system of claim 6, wherein the charity campaign engine is configured to receive from at least one entity a non-conditional contribution as a contribution constraint; and
wherein the charity campaign engine is configured to calculate contribution amounts for the plurality of entities based on the contribution constraints received from each entity, including the non-conditional contribution received from the at least one entity.

11. The system of claim 6, wherein for each entity:
if a contribution amount of the entity can be the contribution budget of the entity without violating a contribution constraint of the entity, the charity campaign engine is configured to set the contribution amount of the entity to the contribution budget of the entity; and
if the contribution amount of the entity cannot be the contribution budget of the entity without violating a contribution constraint of the entity, the charity campaign engine is configured to determine an equation for the entity based on the at least one conditional contribution received for the entity, and is configured to set the contribution amount in the equation to the contribution budget for the entity;
whereby the charity campaign engine determines contribution amounts for a first portion of the plurality of entities, and determines a set of equations corresponding to a second portion of the plurality of entities.

12. The system of claim 11, wherein the charity campaign engine is configured to solve the set of equations to calculate contribution amounts for the second portion of the plurality of entities.

13. A non-transitory computer program product comprising a computer usable-storage device having computer readable program code means embodied in said storage device for performing a charity campaign, comprising:
a first computer readable program code means for enabling a processor to receive contribution constraints from each entity of a plurality of entities that include a contribution budget for a contribution to a charity and at least one conditional contribution to the charity conditioned on a contribution amount of at least one other entity of the plurality of entities;
a second computer readable program code means for enabling a processor to calculate contribution amounts for the plurality of entities based on the contribution constraints received from each entity; and
a third computer readable program code means for enabling a processor to inform each entity of a corresponding contribution amount of the calculated contribution amounts, wherein the third computer readable program code means comprises:
a fourth computer readable program code means for enabling a processor to set initial contribution amounts for the entities to a maximum contribution amount, and
a fifth computer readable program code means for enabling a processor to iteratively decrease contribution amounts for the entities from the initial contribution amount to converge to a vector of contribution amounts feasible for the plurality of entities based on the contribution constraints received from each entity.

14. The computer program product of claim 13, wherein the second computer readable program code means comprises:
a sixth computer readable program code means for enabling a processor to maximize a total contribution amount that is a sum of the calculated contribution amounts.

15. The computer program product of claim 13, wherein the first computer readable program code means comprises:

a sixth computer readable program code means for enabling a processor to receive from at least one entity a non-conditional contribution as a contribution constraint; and wherein the second computer readable program code means comprises:

a seventh computer readable program code means for enabling a processor to calculate contribution amounts for the plurality of entities based on the contribution constraints received from each entity, including the non-conditional contribution received from the at least one entity.

16. The computer program product of claim 13, wherein the fifth computer readable program code means comprises:

a sixth computer readable program code means for enabling a processor to, for each entity, set the contribution amount of the entity to the contribution budget of the entity if a contribution amount of the entity can be the contribution budget of the entity without violating a contribution constraint of the entity; and a seventh computer readable program code means for enabling a processor to, for each entity, determine an equation for the entity that is based at least on the at least one conditional contribution received for the entity and that sets the contribution amount of the entity to the contribution budget if the contribution amount of the entity cannot be the contribution budget of the entity without violating a contribution constraint of the entity;

whereby the sixth computer readable program code means enables a processor to determine contribution amounts for a first portion of the plurality of entities, and the seventh computer readable program code means enables a processor to determine a set of equations corresponding to a second portion of the plurality of entities.

17. The computer program product of claim 16, wherein the fifth computer readable program code means further comprises:

an eighth computer readable program code means for enabling a processor to solve the set of equations to calculate contribution amounts for the second portion of the plurality of entities.

* * * * *